June 17, 1924.
C. D. HANSEN
PUMP DRAIN
Filed Jan. 26, 1924
1,497,719
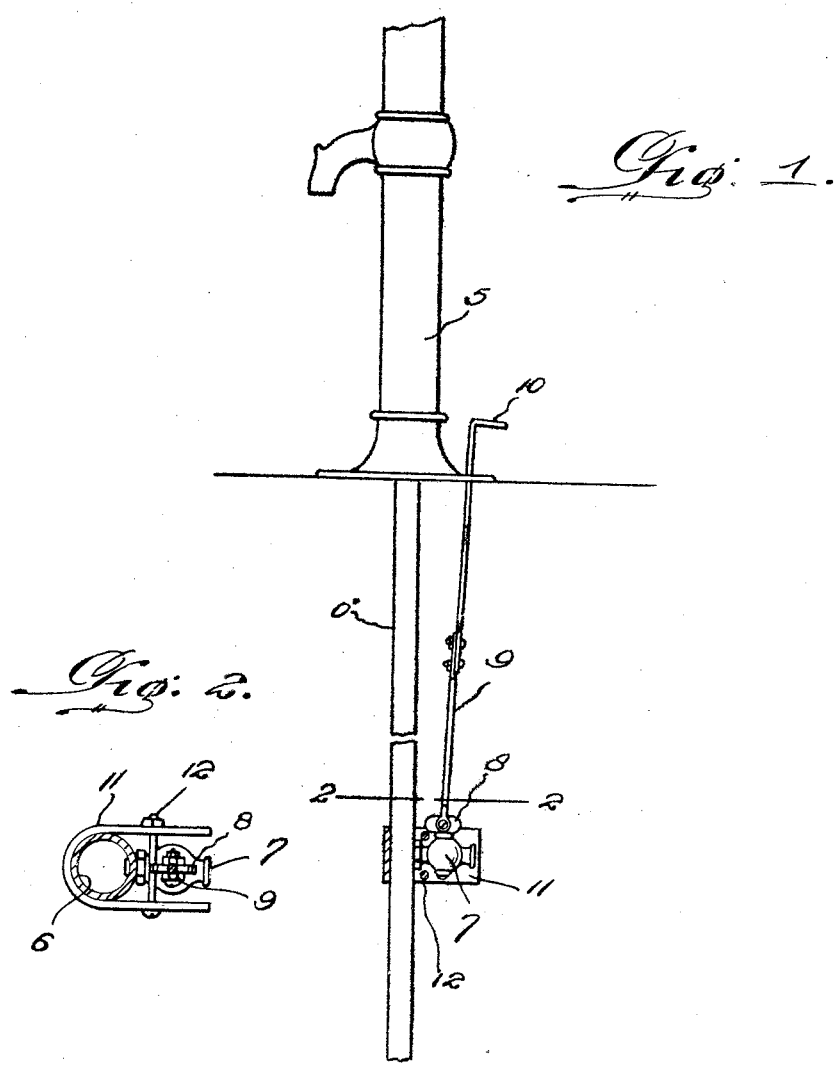
C. D. Hansen,
Inventor
By Clarence A. O'Brien
Attorney Patented June 17, 1924.

1,497,719

UNITED STATES PATENT OFFICE.

CHARLES D. HANSEN, OF OXFORD, NEBRASKA.

PUMP DRAIN.

Application filed January 26, 1924. Serial No. 688,763.

*To all whom it may concern:*

Be it known that I, CHARLES D. HANSEN, a citizen of the United States, residing at Oxford, in the county of Furnas and State of Nebraska, have invented certain new and useful Improvements in Pump Drains, of which the following is a specification.

This invention relates to the general art of pumps and has more particular reference to a means wherein the water within the pump casing may be drained after the same has been used for thereby preventing the freezing of the water within the pump casing and the consequent bursting of the same, or the impairing of the efficient operation of the pump.

The primary object of the present invention resides in the provision of a device of this character that may be readily and inexpensively applied and one wherein the same is not liable to become readily out of order.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout both of the views, Figure 1 is a side elevational view of a pump casing in communication with the well casing, said well casing being equipped with the means whereby the water within said pump casing may be drained whenever the same becomes desirable, and Figure 2 is an enlarged transverse sectional view taken substantially upon the line 2—2 of Figure 1 and looking in a direction downward.

Now having particular reference to the drawing, 5 designates the pump casing and 6 the well casing which is obviously in communication with said pump casing and through which water is drawn from the well by the mechanism within the pump casing 5.

My invention per se embodies the provision of a desirable form of pet cock 7, the inlet nipple of which is engaged within an opening of said well casing 6 at a desirable point thereon. This pet cock 7 includes a turning knob 8 to which is secured the lower end of a sectional rod 9 that extends upwardly and terminates in a handle 10 above the ground level and at a point adjacent the pump casing 5, whereby the pet cock 7 may be manually opened and the water within said pump casing drained outwardly through said pet cock.

As a protection for this pet cock 7 there may be and preferably is provided a U-shaped metallic guard 11 that engages over the well casing 6, the opposite legs of which extend upon opposite sides of said pet cock 7, these legs being secured together so as to prevent disengagement of the guard with respect to the well casing, through the medium of a pair of cross bolts 12 located one at each side of the pet cock.

From the foregoing it will at once be apparent that the water within the pump casing 5 may be easily drained by turning the rod 9 which will consequently open the pet cock and allow this water to flow outwardly therefrom.

Numerous advantages of a device of this character will be at once appreciated by those skilled in the art, and even though I have herein set forth the most practical embodiment of the invention with which I am at this time familiar, it is nevertheless to be understood that minor changes may be made in the invention without departing from the spirit and scope of the appended claim.

Having thus described my invention, what I claim as new and desire to secure by Letters Patent is:—

In combination with a well casing, a drain comprising a pet cock applied to the side of the well casing and communicating with the interior thereof, the said pet cock having a valve provided with a turning knob, a rod composed of joined sections connected with said knob, a U-shaped guard extending around the casing and having the end portions disposed at the opposite sides of the pet cock, and bolts passing transversely through the said end portions of the guard and lying between the valve of the pet cock and the casing, there being a bolt located one at each side of the pet cock.

In testimony whereof I affix my signature.

CHARLES D. HANSEN.